Nov. 13, 1934.    R. J. BURROWS ET AL    1,980,664
RAIL CAR
Filed March 3, 1933    4 Sheets-Sheet 1
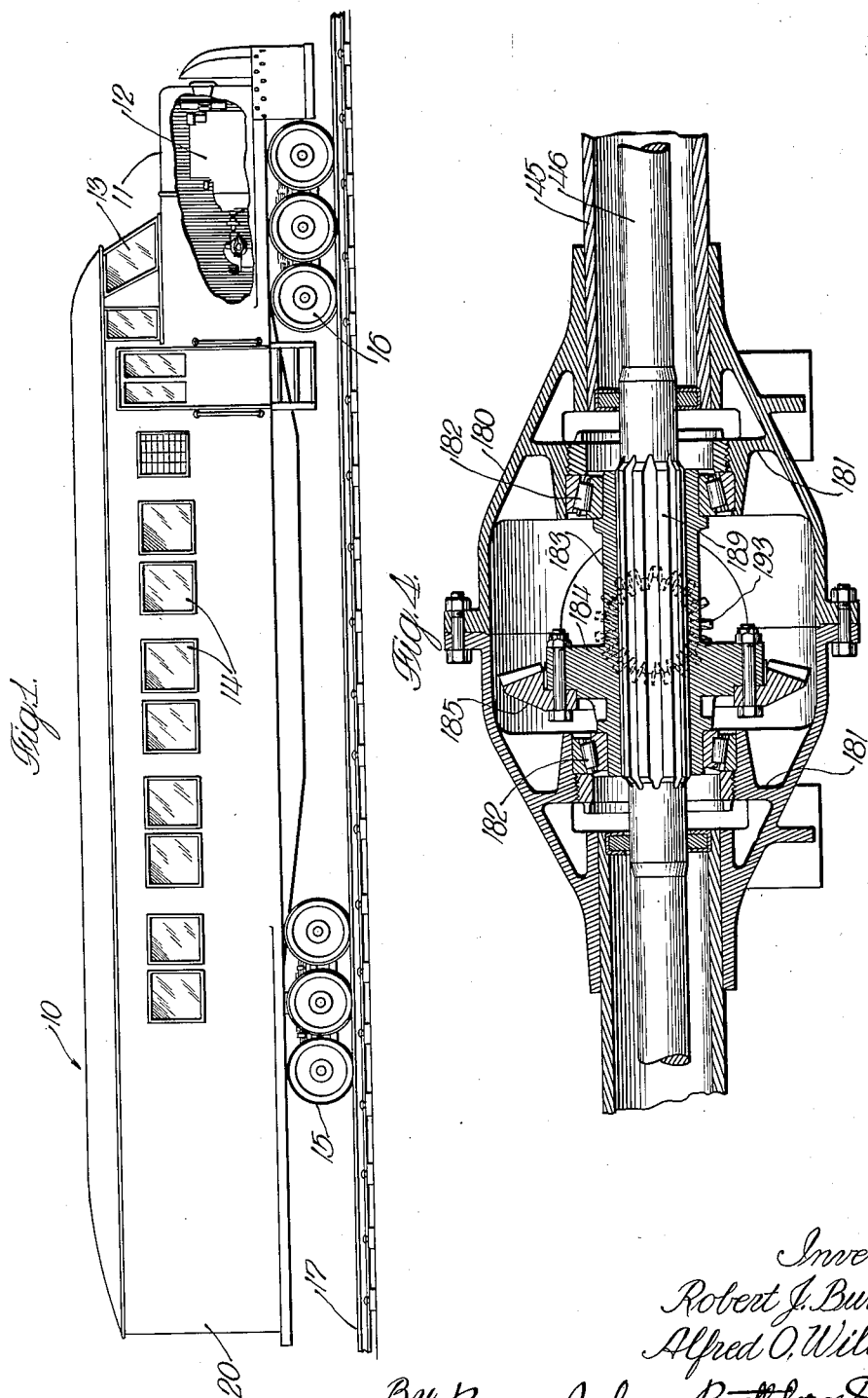
Inventors:
Robert J. Burrows
Alfred O. Williams
By Brown, Jackson, Boettcher & Dienner
Attys.

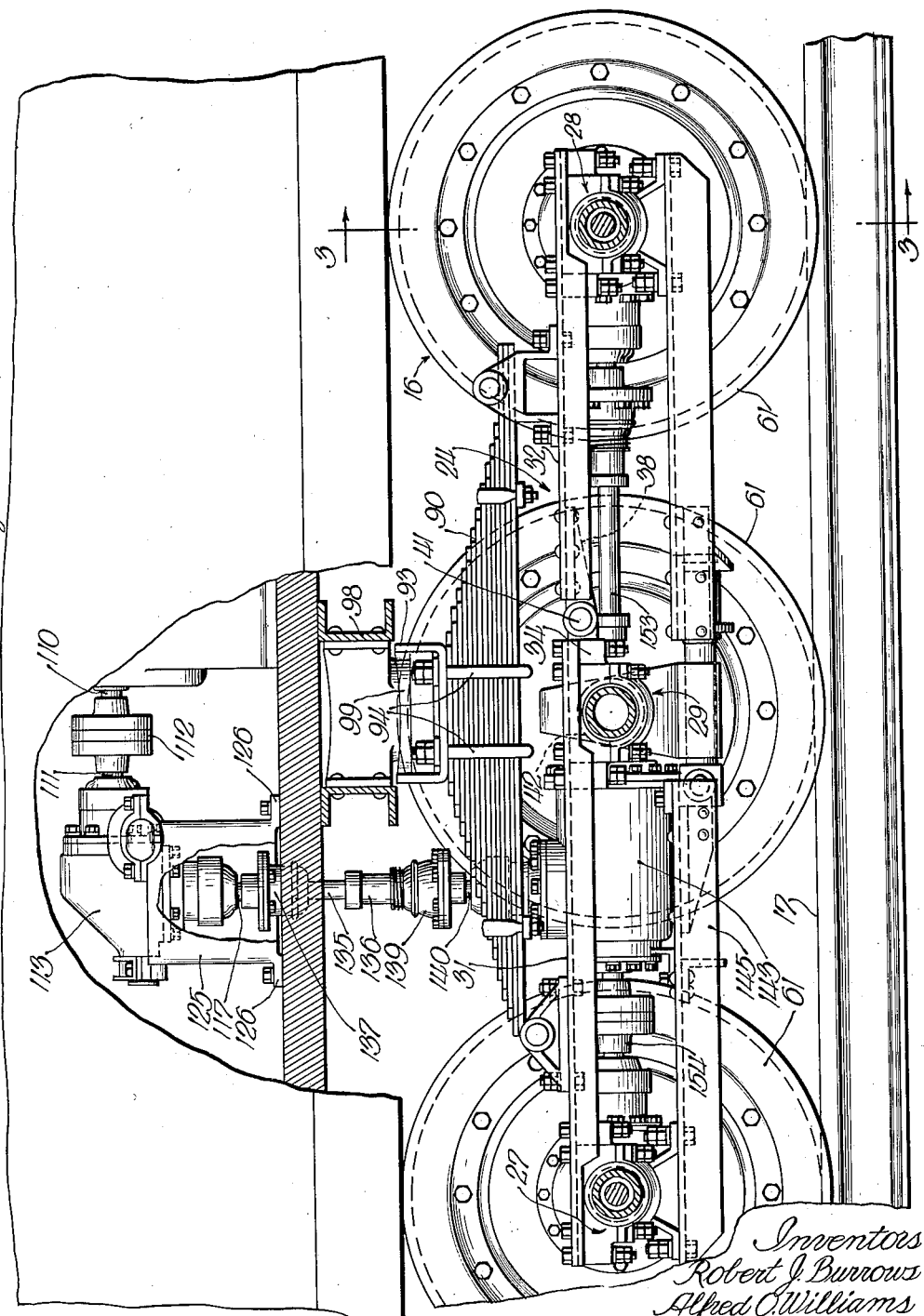

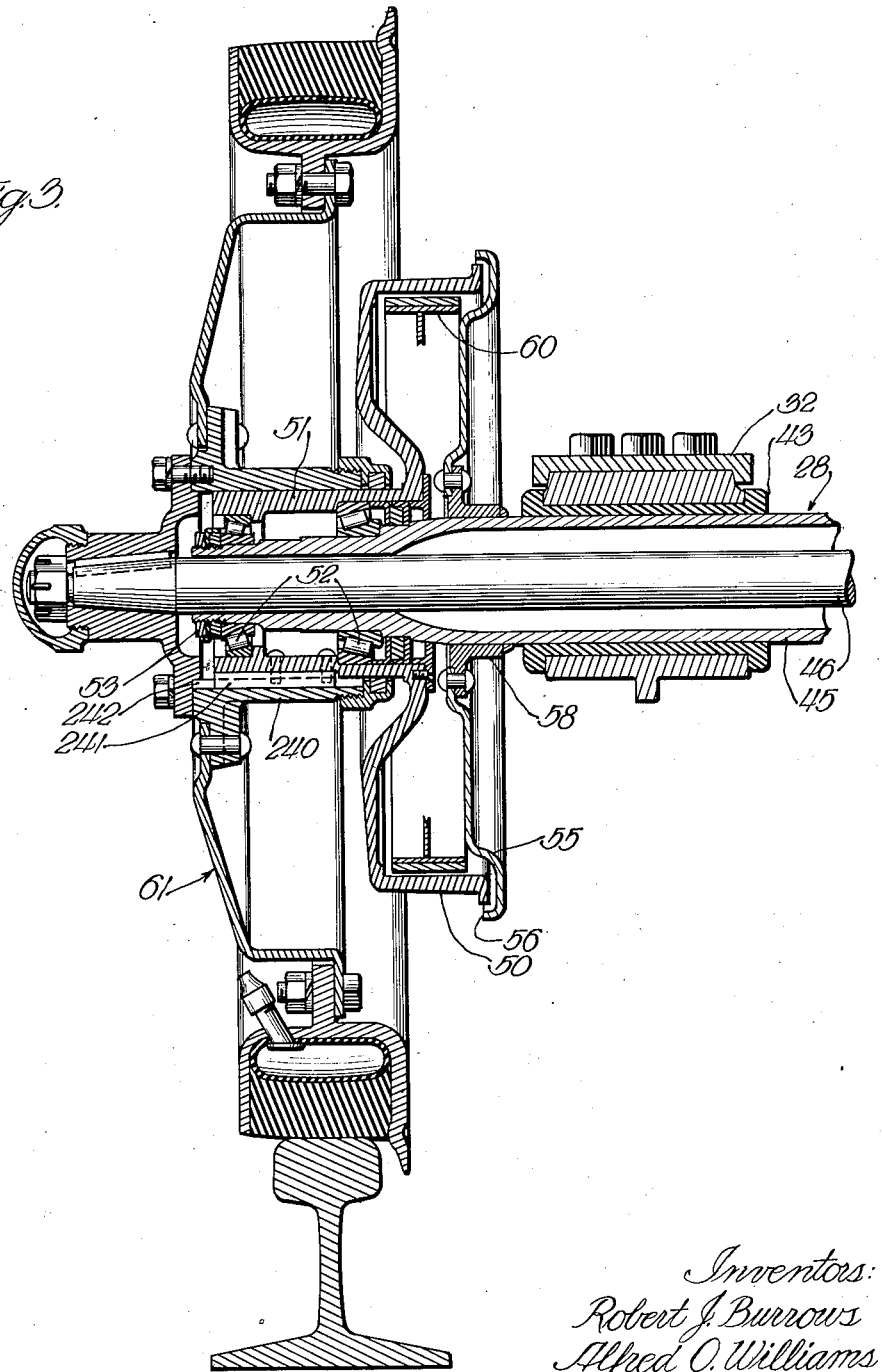

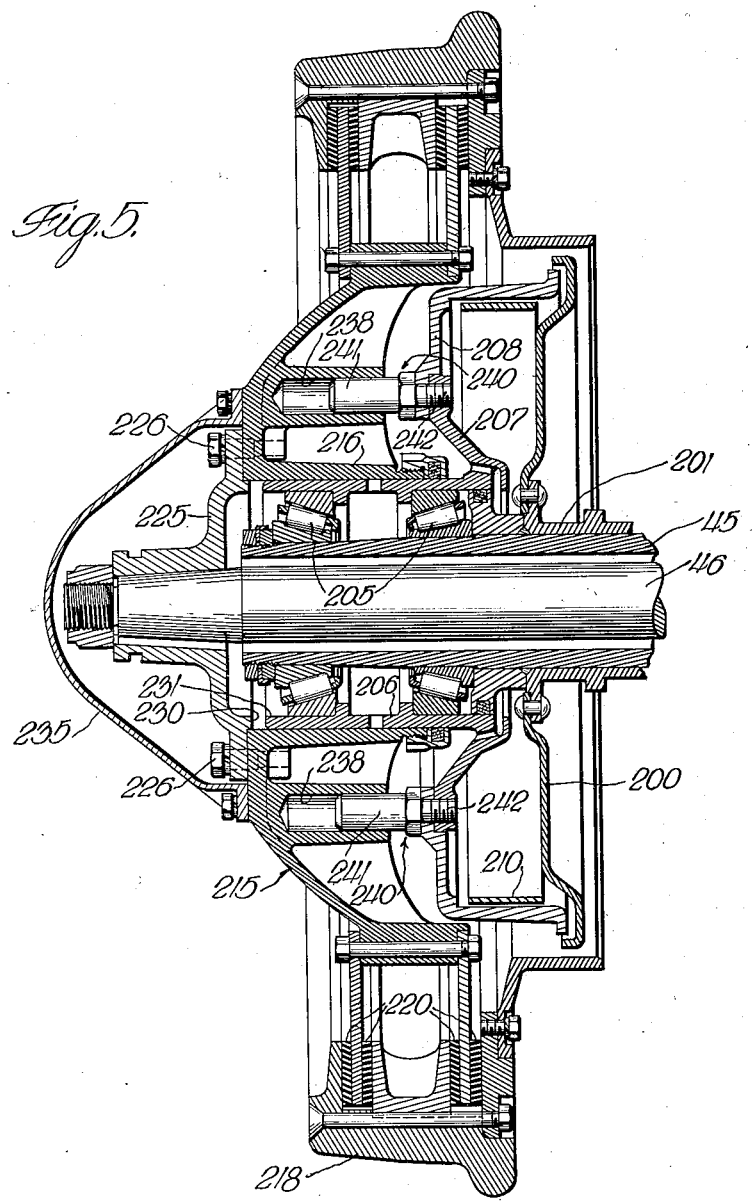

Patented Nov. 13, 1934

1,980,664

UNITED STATES PATENT OFFICE 1,980,664

RAIL CAR

Robert J. Burrows and Alfred O. Williams, Battle Creek, Mich., assignors to Clark Tructractor Company, Battle Creek, Mich., a corporation of Michigan Application March 3, 1933, Serial No. 659,535

20 Claims. (Cl. 105—118)

This application is a continuation in part of our copending application, Serial No. 610,079, filed May 9, 1932, for Rail car.

The present invention relates generally to vehicles, such as railroad cars and the like, and has for its principal object the provision of a supporting truck for such vehicles wherein the supporting wheels of the truck are arranged for limited lateral or floating movement with respect to the frame of the truck while supporting the weight thereof and of the car body or the portion carried thereon.

Another object of the present invention is the provision of improved driving means for a truck of the type wherein the supporting wheels have limited lateral or floating movement to accommodate shifting of the car body relative to the supporting trucks.

Still further, another object of the present invention is the provision of improved connections between each of the supporting wheels and the associated parts accommodating the aforesaid floating movement without affecting the efficiency of the driving means, in case the truck with which the wheels are associated is a driving truck.

These and other objects and advantages of the present invention will be apparent to those skilled in the art after a consideration of the following detailed description of the structure in which the principles of the present invention are preferably embodied and which is illustrated in the accompanying drawings.

In the drawings:

Figure 1 is a side elevation of a complete rail car having a front driving truck and a trailing truck and with part of the rail car body broken away in order to show the disposition of the power plant with respect to the driving truck and associated parts;

Figure 2 is a fragmentary detail view, on a larger scale, showing certain parts broken away and others in section and illustrating the relation between the car body and the driving truck;

Figure 3 is a transverse vertical cross section taken along the line 3—3 in Figure 2 through one of the driving wheels and the adjacent parts of the axle and truck frame and showing in detail the mounting means for the truck wheels, especially the means providing for limited lateral or floating movement of the wheels with respect to the other truck parts;

Figure 4 is a sectional view corresponding to and forming a continuation of the section shown in Figure 3 and illustrating, in connection with the latter figure, the driving connections for the driving axles whereby the latter, together with the driving wheels, have limited lateral or floating movement; and Figure 5 is a transverse vertical cross section taken through a slightly modified form of rail car wheel and showing a somewhat different arrangement of means providing for the desired lateral floating movement of the wheels with respect to the associated supporting hubs.

Referring now more particularly to Figure 1, it will be seen that our improved rail car comprises a streamlined car body having a power plant compartment 11 in which is disposed a motor or other source of power 12, an operator's compartment 13, the usual passenger compartments having windows 14, and supporting trucks 15 and 16 adapted to run on rails 17. To complete the streamlining of the body 10, the latter is preferably provided with a tapered tail 20.

The trucks 15 and 16 for the rail car are practically identical except that the forward truck is usually a driving truck while the rear truck is usually a trailing truck, although both may be made driving trucks if desirable, or both may be made trailing trucks in case the rail car is a trailer and is propelled by some exterior or other source of power. The trucks 15 and 16 are somewhat similar in their generic features to the rail car truck disclosed in our copending application, Serial No. 603,462, filed April 6, 1932, over which in certain details the rail car truck herein disclosed is an improvement.

The driving truck 16 is described and claimed in our copending application of which this application is a continuation in part, and it will therefore suffice to note that the truck is of the six-wheel type having side frames 24 supported upon two outer or driving axles 27 and 28 and upon an intermediate or dead axle 29. Each side frame, as shown in Figure 2, consists of a pair of pivotally connected sections 31 and 32, preferably in the form of channels, and the outer ends of the channel sections 31 and 32 are connected with the driving axles 27 and 28 through suitable bearing means. The inner ends of the frame sections 31 carry castings 34 secured thereto, and one end of each of said castings is provided with means to which castings 38, carried on the companion sections 32, are pivotally connected by pins or pintles 41.

While the above described truck frame includes articulated sections, it is to be understood that the principles of the present invention can as well be utilized in truck frames and the like in which the frame sections are not articulated.

The two driving axles 27 and 28 and the dead axle 29 include axle housings mounted in suitable bearings carried by the side frames, the latter being supported upon the intermediate axle 29 by spherical bearing means 42 and on the front and rear axle housings by cylindrical bearing means 43, as indicated in Figure 3.

Referring now more particularly to Figure 3, it will be seen that the driving axle 28 comprises an axle housing 45 and an enclosed axle shaft 46. The axle housing 45 extends laterally outwardly beyond the side frames and is reduced in diameter at its ends to afford a bearing support for a hub member or brake drum structure 50. The brake drum 50 includes a hub 51 journaled on the outer end of the axle housing 45 by anti-friction means 52 shown, in the illustrated embodiment, as being in the form of tapered roller bearings. Lock nuts 53 are provided to maintain the bearings and the brake drum 50 in proper lateral position and to prevent axial movement thereof on the axle housing 45. Each outer end of the axle housing 45 also carries a stationary brake support or shield 55 having its radially outer portion curved out of the general plane thereof, as indicated in Figure 3 by the reference numeral 56, so as to embrace the edge of the brake drum 50. The support or shield 55 is anchored to the axle housing 45 by means of a collar or hub 58 to which the stationary support 55 may be secured as by riveting or the like. Preferably, the hub or collar 58 is rigidly secured to the housing 45 by brazing, welding or the like.

Disposed within the brake drum 50 in operative relation with respect thereto is a brake shoe structure indicated in its entirety by the reference numeral 60. The brake shoes 60 are adapted to be expanded outwardly into frictional engagement with the interior surface of the brake drum 50 in the usual manner to brake the wheels of the truck.

All of the wheels, indicated by the reference numeral 61, are provided with brakes 60 substantially identical with the brake construction described above and illustrated in Figure 3. While Figure 2 shows the driving truck, it will also be understood that the trailing truck may, and preferably does, have brakes of the identical or similar construction indicated in Figure 3.

The other driving axle 27 and the opposite ends of the side frames 24 are practically identical in construction with the driving axle 28 described, not only as regards the driving axle and brake structure per se but also as regards the bearing structure therefor. It is to be understood that while we have shown the bearings for the ends of the side frames 24 on the front and rear driving axles as being cylindrical in formation, other types of bearings may be provided if desired. For example, instead of being cylindrical the bearings may be spherical or the equivalent, affording a very flexible rail car truck.

As far as flexibility is concerned, the rail car truck of the present invention is made flexible by virtue of the articulated frame members and the spherical bearings by which these members are supported upon the central or intermediate axle. Each of the supporting wheels 61 may, therefore, have vertical movement more or less independent of the other wheels without imposing undue twisting strains on the framework of the truck as a whole. Not only does this construction permit the truck to operate silently and smoothly over uneven road beds and irregular rails, switches, frogs, and the like, but also it permits one wheel to be raised sufficiently to allow the flange of the wheel to clear the rail, thereby permitting the tire thereof to be easily and quickly dismounted.

As more clearly pointed out in the first of our copending applications, mentioned above, the flexible construction is of especial importance where the weight of the car body is to be imposed equally upon all of the supporting wheels. For this purpose we preferably employ semi-elliptic springs 90 having their central portions secured to a truck bolster 93 by means of U-bolts 94. At its center the truck bolster 93 is provided with the conventional king pin construction. By this means the car bolster 98 is supported centrally upon the truck bolster 93. Suitable side bearings 99 are provided and are adapted, in the usual manner, to prevent excessive sidewise rocking of the car body relative to the truck bolster 93.

Mention has been made above that the front and rear axles are driving axles while the central or intermediate axle is a dead axle. The means for transmitting power to the driving axles will now be described. Referring for the moment to Figure 2, it will be observed that the car body 10 carries the power plant 12 and that power is transmitted therefrom to the driving truck 16, the front axle of which is practically directly underneath the power plant 12. The latter includes a longitudinally disposed shaft 110 which drives a shaft section 111 through a flexible coupling 112. The shaft section 111 is journaled for rotation in the housing 113 of a bevel gear set, and at its rear end the shaft section 111 is provided with a bevel gear member which meshes with a companion bevel gear member carried at the upper end of a vertically disposed shaft section 117, also journaled in the bevel gear housing 113. It will be noted that the shaft sections 111 and 117 are practically identical, with the exception that one is disposed longitudinally in a horizontal plane while the other is disposed vertically. Each of these shaft sections is preferably supported by anti-friction bearing means. The housing 113 is supported from the floor of the car by suitable pedestal structure 125 with supporting feet 126 which are adapted to be bolted directly to the floor of the car or to any frame members thereof. Obviously, if desired, the bevel gear set may be supported by other suitable means.

The drive from the shaft section 117 is transmitted downwardly to the driving truck through a vertically disposed shaft construction embodying a pair of telescopic shaft sections 135 and 136, the former being connected with the shaft section 117 through a universal joint 137. The lower end of the lower telescopic shaft section 136 is also provided with a universal joint 139 by which it is connected with a vertically disposed shaft section 140 carried upon the driving truck. The shaft section 140 is arranged to drive suitable differential gearing disposed within a housing or casing 143, this housing being preferably supported upon the driving truck by being secured to a torque arm 145 which is connected at one end with the housing of the driving axle 27 and has its other end anchored to the intermediate or dead axle 29, as more clearly set forth in our copending application of which this application is a continuation in part.

The casing 143 constitutes a differential housing and the shaft section 140 is arranged for driving the differential mechanism disposed therein. The differential mechanism is operatively connected to drive the longitudinally disposed driving shafts 153 and 154, the latter extending forwardly and rearwardly so as to connect with the driving axles 27 and 28.

As best shown in Figure 4, the forward axle housing 45 consists of two tubular sections joined together by means of a central casing 180 having interior flanges 181 affording a support for bearings 182 in which is journaled a sleeve 183.

The latter is provided with a radial flange 184 to which is bolted a bevel gear 185. The sleeve 183 is provided with splines, and the driving axle 46 journaled in the axle housing 45 constitutes a through axle shaft and is provided centrally thereof with cooperating splines 189 by which rotation of the gear member 185 drives the through axle 46. The gear member 185 receives its drive from the forwardly extending drive shaft 153 by means of a pinion 193 supported by suitable bearing means (not shown) in the casing 180.

The drive from the differential mechanism disposed within the differential housing 143 to the rear driving axle 27 is substantially the same as just described above in connection with the drive to the forward driving axle 28. Also, the construction of the rear driving axle is practically identical with the construction of the forward driving axle illustrated in Figures 3 and 4.

As mentioned above, the driving axles 46 are through axles, that is, the axles extend from the driving wheel on one side of the truck frame to the driving wheel on the opposite side, and the ends of the driving axle are rigidly secured to the wheels. In rail car construction it is desirable that the supporting wheels for the trucks shall be able to float laterally a limited amount so as to prevent transmitting all of the road bed inequalities to the car body. The present invention contemplates providing a construction of this sort by mounting the hubs of the driving wheels for limited lateral movement upon the hubs of the brake drums 50.

We have described above how the hubs 51 of the brake drums are journaled upon the laterally outer ends of the axle housings 45. The hubs of the driving wheels, indicated in Figure 3 by the reference numeral 240, are disposed concentrically with respect to the brake drum hubs 51. The latter are provided with transverse keys 241 and the hubs 240 of the driving wheels have cooperating slots 242 to receive the keys 241. The slots 242 are longer than the keys 241 and provide an arrangement whereby the wheels 61 may have limited lateral movement on the hubs 51 of the brake drums but are nevertheless in firm driving engagement with the brake drums and with the driving shafts 46 at all times. The splined construction 189 described above in connection with the means for driving the axle 46 provides for lateral movement of the driving shafts 46 in the associated sleeves 183, the latter being held in place by the bearings 182, as best shown in Figure 4. From that figure it will be seen that when the sleeve 183 is driven the shaft 46 is also driven but is free to float laterally a limited amount.

The operation of our improved rail car construction is believed to be apparent from the above description. The power plant 12 of the rail car may, by virtue of the vertically disposed driving means for the front driving truck, be arranged well forward so that approximately the same weight will be imposed on the rear truck as on the forward truck. Where the power plant 12 is in the form of an internal combustion engine of the usual type, conventional transmission means may be incorporated therewith, such as the usual change gear box, in which case the drive shaft 110, see Figure 2, will be driven from such change gear means. The drive from the power plant 12 is thus transmitted to the bevel gear set 113, and from thence the drive is transmitted through the flexible telescopic drive shaft connection to the differential disposed within the differential housing 143. By virtue of the differential means therein the drive is divided differentially between the front and rear driving axles.

The driving axles are through axles and are rigidly secured to the wheels. The wheels are supported for limited lateral movement upon the hubs of the associated brake drums and the latter are mounted for rotation upon the ends of the axle housings. Preferably, although not necessarily, the wheels for the intermediate axle are fastened directly to the hubs of the associated brake drums.

In Figure 5 we have illustrated a somewhat different form of rail car wheel but which, nevertheless, includes the essential features of the rail car wheel and associated parts described above. In this figure the axle member or housing is designated by the reference numeral 45 and is substantially identical, for all practical purposes, with the axle housing 45 shown in Figure 3. Likewise, the driving axle shaft 46 shown in Figure 5 is similar to the one shown in Figure 3.

The laterally outer ends of the axle housing 45 are each provided with a brake support 200 which is riveted to a sleeve 201, the latter being rigidly secured to the axle housing 45 as by welding or the like. The axle housing 45 is also provided with bearing means 205 which rotatably supports a hub member 206. The hub member 206 is provided with a radially outwardly extending flange 207 adjacent the brake support 200, the flange being adapted to receive a brake drum 208 of conventional construction and with which braking means 210 is adapted to cooperate.

The wheel member mounted on the hub member 206 is designated in its entirety by the reference numeral 215 and comprises a hub portion 216 mounted on the hub member 206 and a tread portion 218 secured to the central wheel body on the hub by cushioning disks 220 which provide an exceptionally resilient wheel but, having filed an application on November 25, 1933, Serial No. 699,700, in which these and related features are more clearly disclosed and claimed, we do not claim any of these details in this application.

The laterally outer ends of the axle shaft 46 are tapered and each has a driving flange 225 keyed thereto. The driving flange 225 is rigidly secured to the wheel member 215 by cap screws 226 or the equivalent, so that the wheel members are securely and rigidly fastened onto the through axle shaft 46 whereby the two opposite wheel members move together. The hub 216 of the wheel member is capable of limited lateral or axial movement on the hub member 206, this lateral movement being limited by a shouldered section 230 formed on the driving member 225 which is adapted to abut against the laterally outer end 231 of the hub member 206. As will be obvious, the wheel member at one side of the truck limits the lateral shifting movement of the axle 46 and interconnected wheels in one direction, while the wheel member at the opposite side of the truck limits the axial movement in the other direction. Preferably, a streamlined hub cap 235 is bolted to the wheel member and then closes the outer end of the axle shaft 46 at each side of the truck.

The wheel shown in Figure 5 is provided with means for accommodating the aforesaid lateral shifting movement of the wheel members on the hub members but which, at the same time, effectively provides for the transmission of braking reactions from the brake drum 208, which is mounted on the hub member 206, to the wheel member, which is laterally shiftable on the hub member. For this purpose the central portion of the wheel member is provided with a circumferential series of sockets 238, preferably formed integrally with the body of the wheel member, and these sockets are arranged in a direction parallel to the axis of the wheel. Engaged within each of these sockets is a stud member 240 which is provided with a cylindrical portion 241 slidably disposed within the associated wheel socket and with a threaded portion 242 which is adapted to be threaded into a suitable aperture in the flange 207. These studs 240 therefore form, in addition, the means for securing the brake drum 208 to the flange 207 of the hub member 206. Because of the cylindrical formation of the sockets 238 and the associated studs 241, lateral shifting movement of the car wheels is provided for while the wheel members are held in non-rotatable relation with respect to the hub members 206 on which the brake drums are mounted.

While we have described above certain structure in which the principles of the present invention have been embodied, it will be understood that our invention is not to be limited to the specific means shown and described, but that, in fact, widely different means may be employed in the practice of the broader aspects of our invention.

What we claim, therefore, and desire to secure by Letters Patent is:

1. A truck for rail cars and the like comprising, in combination, longitudinally disposed side frames, axle housings non-rotatably carried near the ends of said frames, and wheel axles disposed in said housings, said wheel axles having bearing support on said housings and adapted to have limited lateral movement therein.

2. A truck for rail cars and the like comprising, in combination, longitudinally disposed side frames, axle housings mounted at the outer ends of said side frames, means preventing said housings from rotating relative to said side frames, a central wheel axle carried by said side frames intermediate said axle housings, a through axle journaled for rotation in each of said axle housings and having bearing support thereon and arranged for limited lateral movement therein, wheels carried by the outer ends of said axles, and means for driving said through axles.

3. A truck for rail cars and the like comprising, in combination, longitudinally disposed side frames, axle housings mounted at the ends of said side frames and extending laterally outwardly thereof, brake drums journaled on the outer ends of said axle housings, a through axle disposed in each of said housings, wheels secured to the outer ends of said axles and supported for limited lateral movement on said brake drums, and means associated with said brake drums for resisting braking stresses.

4. A rail car comprising, in combination, longitudinally disposed side frames, axle housings journaled for rotation near the outer ends of said frames, said housings extending laterally beyond the frames, a brake drum having a hub and mounted on each end of the housings, a wheel axle disposed in each of said axle housings and extending outwardly thereof, wheels secured to the outer ends of said axles and each including a hub mounted upon the hub of the associated brake drum, and means connecting the wheel hubs to the brake drum hubs to provide non-rotatable but limited lateral movement therebetween, whereby said wheels and connected axles floatingly support said side frames.

5. A truck for rail cars and the like comprising, in combination, a relatively stationary axle member, a hub member rotatable thereon, and a wheel member mounted on said hub member to rotate therewith and to have limited axial movement thereon.

6. A truck for rail cars and the like comprising, in combination, a truck frame, an axle housing connected therewith in substantially non-rotatable relation, a wheel hub journaled for rotation on said housing and fixed against axial movement thereon, and a wheel member carried by said hub and arranged to rotate therewith and to have limited axial movement thereon.

7. A truck for rail cars and the like comprising, in combination, a truck frame, an axle housing connected with the truck frame and extending laterally therefrom, a wheel hub mounted on the laterally extended end of said axle housing, a wheel member carried by said hub, and cooperating means on said wheel hub and said wheel member for preventing relative rotation therebetween and providing for limited relative shifting movement in an axial direction between said wheel member and said hub member.

8. A truck for rail cars and the like comprising, in combination, longitudinally disposed side frames, a transversely disposed axle member connected therewith and extending laterally therefrom at opposite ends, a hub rotatably mounted on each of said laterally extended ends and prevented from axial movement with respect thereto, a wheel member mounted on each of said hub members, cooperating means carried by said hub member and said wheel member for preventing relative rotation between the hub and wheel member and providing for a limited amount of relative axial shifting therebetween, and means rigidly connecting the wheel members at opposite sides of said truck frames together.

9. A rail car truck comprising longitudinally disposed side frames, a tubular axle housing connected therewith and extending laterally outwardly therefrom at opposite sides thereof, a wheel hub journaled for rotation on each of said laterally extended ends of the axle housing, a wheel member mounted on each of said wheel hubs, means connecting said wheel member with said wheel hub and preventing relative rotation therebetween but providing for limited axial shifting, and a through axle shaft disposed within said axle housing and rigidly connected with the wheel members at opposite sides of said truck frames.

10. A truck for rail cars and the like comprising, in combination, longitudinally disposed frame members, a transversely disposed axle housing connected therewith and extending laterally therefrom at each side thereof, a wheel hub for each laterally extended end of said axle housing, anti-friction means supporting each of said hubs on the associated end of said axle housing, a wheel member mounted for limited lateral movement on each of said wheel hubs and serving to transmit loads imposed thereon through said bearing means to said axle housing, an axle shaft mounted within said axle housing and extending laterally therefrom at opposite ends thereof, and means rigidly connecting the opposite ends of said axle shaft with said wheel members to cause the latter to move laterally together.

11. A driving truck for rail cars and the like comprising, in combination, longitudinally disposed side frames, an axle housing connected therewith and extending laterally therefrom at opposite sides, a hub member journaled for rotation on said laterally extended ends of the axle housing, a wheel member mounted on each of said hub members in non-rotatable relation but arranged to have movement relative thereto in an axial direction, a shaft disposed within said axle housing and connected at its ends with said wheel members, said axle being movable axially with said wheel members, and means carried by said housing and having non-rotatable but slidable connection with said axle for driving said wheel members therefrom.

12. A truck for rail cars and the like comprising a truck frame, an axle housing connected therewith, wheels supported for rotation on said housing and adapted to have limited axial movement with respect thereto, means including a driving shaft connected at opposite ends with said wheels, said shaft serving to rigidly connect said wheels to move together, a driving gear journaled for rotation in said housing and having splined connection with said shaft to accommodate said axial movement of the wheels and the shaft connecting the same, and means for driving said gear member.

13. In a vehicle having a frame, a transversely disposed axle housing secured thereto, a wheel disposed at each end of said housing and adapted to have lateral axial movement with respect thereto, a through axle disposed in said housing and serving to rigidly connect said wheels to move together, a gear member disposed in said housing and adapted to rotate with said axle and to have a limited amount of axial movement with respect thereto to accommodate the lateral movement of said wheels, and means for driving said gear member.

14. A truck for rail cars and the like comprising, in combination, longitudinally disposed side frames, axle housings mounted at the ends of said frames, a through axle journaled for rotation in each of said axle housings and arranged for limited lateral movement therein, and wheels carried at the outer ends of said axles and having bearing support on the outer ends of said axle housings.

15. A truck for rail cars and the like comprising, in combination, longitudinally disposed side frames, axle housings mounted at the ends of said side frames and extending laterally outwardly thereof, hub members journaled on the outer ends of said axle housings, a through axle disposed in each of said housings, wheels secured to the outer ends of said axles and supported for limited lateral movement on said hub members, and means connecting said wheels to said hub members, respectively, and accommodating said lateral movement but arranged to cause said hub members to rotate with said wheels.

16. A truck for rail cars and the like comprising, in combination, longitudinally disposed side frames, axle housings mounted at the ends of said side frames and extending laterally outwardly thereof, hub members journaled on the outer ends of said axle housings, a through axle disposed in each of said housings, wheels secured to the outer ends of said axles and supported for limited lateral movement on said hub members, and means forming a splined connection between said wheels and the associated hub members to accommodate said limited lateral movement and to provide for the rotation of said wheels with said hub members.

17. A driving truck for rail cars and the like comprising, in combination, longitudinally disposed side frames, axle housings mounted at the ends of said side frames, hub members journaled on the outer ends of said housings, a through axle disposed in each of said housings, wheels secured to the outer ends of said axles and supported for limited lateral movement on said hub members, each of the latter including a radially outwardly disposed flange, and means carried by each of said flanges and cooperating with the associated wheel for preventing relative rotation between the wheel and its associated hub member.

18. A driving truck for rail cars and the like comprising, in combination, longitudinally disposed side members, axle housings mounted adjacent the ends of said side members and extending laterally therefrom, hub members journaled for rotation on the ends of said axle housings, a through axle disposed in each of said housings, wheel members secured to the outer ends of said axles in driving relation and supported for lateral movement on said hub members, means providing a plurality of sockets on the wheel member disposed radially outwardly of said axle, and means carried by said hub member and engaging said sockets to accommodate said limited lateral movement and preventing relative rotation between the wheel member and the associated hub member.

19. A truck for rail cars and the like comprising, in combination, longitudinally disposed side frames, axle housings mounted at the ends of said side frames and extending laterally outwardly thereof, hub members journaled on the outer ends of said axle housings and each provided with a radially outwardly disposed flange, a through axle disposed in each of said housings, wheels secured to the outer ends of said axles and supported for limited lateral movement on said hub members, means providing a circumferential series of axially directed sockets on each of said wheels, and a plurality of studs secured to the flanges on said hub members and adapted to engage in the sockets of the associated wheel members, whereby said limited lateral movement between the wheel member and the hub member is accommodated while relative rotation between said members is prevented.

20. A truck for rail cars and the like comprising, in combination, longitudinally disposed side frames, axle housings mounted at the ends of said side frames, hub members journaled on said axle housings and each provided with a radially outwardly extending flange, a through axle disposed in each of said housings, wheels secured to the outer ends of said axles and supported on said hub members for limited lateral movement with respect thereto, means providing a plurality of axially directed sockets on each of said wheel members, a brake drum mounted on the flange of each of said hub members, and a plurality of studs secured to the flange of each of said hub members and serving to secure the associated brake drum thereto, said studs being adapted to be received within the sockets on the associated wheel member to accommodate said limited lateral movement and to cause the hub member and brake drum to rotate with the associated wheel member.

ROBERT J. BURROWS.
ALFRED O. WILLIAMS.